United States Patent Office 3,205,185
Patented Sept. 7, 1965

3,205,185
MODIFICATION OF POLYOLEFINS WITH
POLYCARBOXYLIC ACIDS
Gerald A. Lessells, Sharonville, and Louis J. Rekers, Wyoming, Ohio, assignors to National Distillers and Chemical Corporation, New York, N.Y., a corporation of Virginia
No Drawing. Filed Apr. 25, 1961, Ser. No. 105,291
9 Claims. (Cl. 260—23)

This invention relates to an improved thermoplastic polymer and, more particularly, to a polyolefin resin having improved properties. Still more particularly, the invention relates to improving the melt fracture and flow properties of a polyolefin resin by incorporating therein a suitable polycarboxylic acid.

Under the relatively high shear stresses of modern extrusion equipment, thermoplastic polymers, such as linear and so-called conventional polyethylene, as defined hereinafter, polypropylene, and the like, have tendencies to develop melt fracture, that is, surface ripples or roughness, and to resist flow. Prior art methods of overcoming these tendencies, for example, copolymerization with other olefins, e.g., butene-1, are relatively expensive and complicated.

It is an object of this invention to provide a polyolefin resin having improved properties.

A further object of this invention is to provide a simple means of reducing the tendencies of a polyolefin resin to develop melt fracture and to resist flow when subjected to relatively high shear stresses.

Still other objects of the invention will be apparent from the ensuing description thereof.

It has been found that polyolefin resins may be inhibited against melt fracture tendencies and resistance to flow when subjected to high shear stresses by incorporating into the resin a small amount, based on the weight of the polyolefin, of certain selected polycarboxylic acids.

Polycarboxylic acids suitable for practice of this invention are preferably aliphatic acids containing from about 6 to about 60 carbon atoms. Since the effectiveness of these acids appears to depend upon the carboxylic groups, the presence is permissible of other groups such as for example halogens or alkoxy groups which are not chemically reactive toward carboxylic groups and which are not close enough to the carboxylic groups to influence them sterically. Particularly suitable acids are saturated or substantially saturated and include, for example, aliphatic dicarboxylic acids, such as adipic acid and isomeric mixtures of saturated $C_{10}$ dicarboxylic acids, and aliphatic tricarboxylic acids, such as a liquid trimeric acid, e.g., Emery 3162-D Trimer Acid.

The isomeric mixture of $C_{10}$ aliphatic dicarboxylic acids referred to herein may be prepared by dimerizing butadiene with finely divided sodium, followed by carbonation, hydrogenation, and neutralization, as is described, for example, in U.S. Patent No. 2,816,916. The resultant mixture consists of a major portion of the branched-chain acids, 2,2-diethyladipic acid and 2-ethylsuberic acid, and a minor proportion of the straight chain acid, sebacic acid.

In general, the amount of polycarboxylic acid incorporated into the composition to be inhibited against melt fracture may be varied depending on the desired reduction in melt-fracture characteristics. Thus, the polycarboxylic acids disclosed herein may be used in amounts of from about 0.1% to about 5% based on the weight of the polymer, and preferably in amounts of from about 0.5% to about 2.0%.

The selected polycarboxylic acid may be incorporated into the polymer by any convenient method for providing uniform mixtures of polymeric material and additive materials. Such methods include, for example, the addition of the polycarboxylic acid as a solid in solution in an inert solvent or as a slurry in a non-solvent to the plastic in either dry fluff or molding powder form, followed by drying and tumbling. The polycarboxylic acid may also be incorporated into the plastic by melt blending the ingredients in conventional apparatus, such as an extruder, a Banbury mixer, heated rolls, etc.

The term "linear polyethylene," as used herein, refers to polyethylenes having annealed densities above about 0.945 and having fewer than about ten methyl groups per 1000 carbon atoms. They are normally produced by polymerizing ethylene at relatively low pressures, e.g., below about 100 atmospheres, and at relatively low temperatures, e.g., from about 50° to about 100° C., using complex metal organic complexes or supported metal oxides as catalysts. "Conventional polyethylenes" in general have higher degrees of chain branching and lower densities than the linear variety and normally are produced by processes involving pressures of at least about 1,000 atmospheres.

The invention will be described in greater detail by the following examples. These examples and embodiments are illustrative only, and the invention is not intended in any way to be limited thereto except as indicated by the appended claims. Although linear polyethylene has been used in the specific examples, it will be understood that the process of this invention is not limited thereto and may be applied to other polyolefins, such as for example so-called conventional polyethylene, polypropylene, and so forth. All parts are expressed by weight unless otherwise specified.

*Example I*

In order to illustrate the marked improvement provided by the practice of this invention in the melt fracture tendencies of polymeric substances, the melt fracture of virgin, solid linear polyethylene was measured both without (Run 1) and with (Runs 2–14) varying amounts of various polycarboxylic acids and other additives. The additives were incorporated into the polyethylene by mixing the polyethylene in an extruder with the additive over a period of from one to two minutes at 400° to 500° F., following which the homogeneous extrudate was cooled and granulated. In Runs 2 through 9 polycarboxylic acids within the scope of this invention were used. Comparative Runs 10 through 14 were made using compounds somewhat similar in structure to the selected polycarboxylic acids embodied herein, but which were ineffective in improving melt fracture, thus pointing out the unexpected and novel behavior of the specific polycarboxylic acids embodied in this invention.

Onset of melt fracture was measured by a melt index apparatus, such as is described in ASTM-D-1238-57T, having a 0.0825 inch diameter orifice, but in which the loading on the piston was applied through a variable compressed-air cylinder instead of fixed weights. In determining onset of melt fracture, granulated polymer was first charged to the cylinder of the apparatus, the piston inserted, and the temperature of the polymer brought to 190° C. Loads in increments of about two kilograms were then applied to the piston, and the surface texture of the concurrent extrudate was examined. At the loading which resulted in the first appearance of surface roughness or surface ripples in the extrudate, the volume flow rate through the orifice was recorded by weighing the amount of polymer extruded in a given time interval, usually about one minute, and dividing this rate by the density of the polymer. Onset of melt fracture, which is the shear rate at which melt fracture is first observed, is calculated by using the following equation:

$$\text{Onset of melt fracture} = \frac{4Q}{\pi r^3}$$

wherein

Q is the volume flow rate in cc./sec. and
r is the radius of the orifice in centimeters.

Consequently, onset of melt fracture is expressed in sec.$^{-1}$.

TABLE I

| Run | Additive | | Onset of Melt Fracture, sec.$^{-1}$ |
|---|---|---|---|
| | Type | Wt. percent | |
| 1 | None | | 50 |
| 2 | Adipic acid | 0.5 | 130 |
| 3 | do | 1.0 | 205 |
| 4 | do | 3.0 | 140 |
| 5 | do | 5.0 | 150 |
| 6 | Isomeric mixture of saturated C$_{10}$ dicarboxylic acids | 1.0 | 125 |
| 7 | do | 2.0 | 70 |
| 8 | Trimer acid [1] | 1.0 | 130 |
| 9 | do.[1] | 2.0 | 65 |
| 10 | Di-2-ethylhexyl isosebacate | 2.0 | 30 |
| 11 | Oleic acid | 2.0 | 45 |
| 12 | Caprylic acid | 2.0 | 45 |
| 13 | Dioctyl adipate | 2.0 | 45 |
| 14 | Sodium trimate | 2.0 | 45 |

[1] The trimer acid is marketed under the trade name of Emery 3162-D Trimer Acid. It has an acid value between 183 and 188, a saponification value between 192 and 198, a neutralization equivalent between 299 and 306, and a viscosity at 25° C. between 65,000 and 80,000 centipoises. It is produced by trimerizing the mixture of unsaturated fatty acids derived from soybean oil, which when neutralized with sodium hydroxide will form sodium trimate.

As can be seen from the foregoing data, the incorporation of the polycarboxylic acids of the invention effected significant improvements in the melt fracture tendency of a polyethylene resin. When no additive was used (Run 1), the onset of melt fracture was 50 sec.$^{-1}$. By incorporating into the resin various polycarboxylic acids as embodied herein (Runs 2–9), onset of melt fracture was improved to 65–205 sec.$^{-1}$. When compounds other than the polycarboxylic acids of this invention were incorporated into the resin (Runs 10–14), onset of melt fracture was reduced to 30–45 sec.$^{-1}$.

*Example II*

Although the polycarboxylic acids embodied for use herein are incorporated into polymeric compositions to effect an improvement against tendencies of the polymer to exhibit melt fracture, it has been found that the incorporation into the polymer of these additives also improves flowability, i.e., the flow rate of the polymer at the high rates of shear generally required for economical production rates in modern commercial extrusion equipment.

Flowability is measured by "flow index" which is a measure of non-Newtonian flow derived from determination of isothermal flow rate (I in dg./minute) at two different load values, $P_a$ and $P_b$, using the melt index apparatus described in ASTM–D–1238–57T. From the expression $$\frac{I_a}{I_b} = (P_a/P_b)^m$$

where $m$="flow index," $P_a = 10$ kg., $P_b = 2$ kg., and $I_a$ and $I_b$ are the flow rates at the corresponding loads, the form $m = 0.62 \ln(I_{10}/I_2)$ is derived.

The following data illustrate the improvement obtained in "flow index" by use of various amounts of one of the polycarboxylic acids embodied herein. "Flow index" was measured at 190° C. ±0.2°.

TABLE II

| Run | Polycarboxylic Acid | | Flow Index |
|---|---|---|---|
| | Type | Wt. percent | |
| 15 | None | | 1.56 |
| 16 | Adipic | 1.0 | 1.77 |
| 17 | do | 3.0 | 1.91 |
| 18 | do | 5.0 | 1.70 |

Although the compositions of this invention are comprised essentially of a polymeric substance containing a small, defined amount of a specified polycarboxylic acid, the compositions may also, if desired, contain small amounts of other additives such as anti-oxidants and the like, provided that the added ingredients are not present in amounts sufficient to alter substantially the effectiveness of the polycarboxylic acid selected for improving melt fracture.

While there are above disclosed but a limited number of embodiments of the present invention, it is possible to produce still other embodiments without departing from the inventive concept herein disclosed, and it is desired therefore that only such limitations be imposed on the appended claims as are stated therein.

What is claimed is:

1. A polyolefin prepared from an alpha-monoolefin having 2 to 4 carbon atoms in the monomer and a small amount of at least one polycarboxylic acid effective to improve the melt fracture tendency of the resin, said polycarboxylic acid being selected from the group consisting of adipic acid, an isomeric mixture of saturated C$_{10}$ dicarboxylic acids, and a trimerized mixture of unsaturated fatty acids derived from soybean oil.

2. Polyethylene containing between 0.1% and 5% by weight of a polycarboxylic acid selected from the group consisting of adipic acid, an isomeric mixture of saturated C$_{10}$ dicarboxylic acids, and a trimerized mixture of unsaturated fatty acids derived from soybean oil.

3. The polyethylene composition of claim 2 wherein the polycarboxylic acid is adipic acid.

4. The polyethylene composition of claim 2 wherein the polycarboxylic acid is an isomeric mixture of saturated C$_{10}$ dicarboxylic acids.

5. The polyethylene composition of claim 2 wherein the polycarboxylic acid is a trimerized mixture of unsaturated fatty acids derived from soybean oil.

6. Polypropylene containing between 0.1 and 5% by weight of a polycarboxylic acid selected from the group consisting of adipic acid, an isomeric mixture of saturated C$_{10}$ dicarboxylic acids, and a trimerized mixture of unsaturated fatty acids derived from soybean oil.

7. The polypropylene composition of claim 6 wherein the polycarboxylic acid is adipic acid.

8. The polypropylene composition of claim 6 wherein the polycarboxylic acid is an isomeric mixture of saturated C$_{10}$ dicarboxylic acids.

9. The polypropylene composition of claim 6 wherein the polycarboxylic acid is a trimerized mixture of unsaturated fatty acids derived from soybean oil.

References Cited by the Examiner

UNITED STATES PATENTS

| | | | |
|---|---|---|---|
| 2,448,799 | 9/48 | Happoldt, et al. | 260—28 |
| 2,449,418 | 9/48 | Sharkey | 260—45.85 |
| 2,838,437 | 6/58 | Busse et al. | 260—31.2 |
| 2,956,035 | 10/60 | Mock | 260—23 |
| 3,000,851 | 9/61 | Schweitzer | 260—45.85 |
| 3,017,238 | 1/62 | Levine et al. | 260—23 |
| 3,052,666 | 9/62 | Engel | 260—94.9 |

LEON J. BERCOVITZ, *Primary Examiner.*

ALPHONSO D. SULLIVAN, *Examiner.*